US005234095A

United States Patent [19]

Patin

[11] Patent Number: 5,234,095

[45] Date of Patent: Aug. 10, 1993

[54] CONVEYING DEVICE, ESPECIALLY WITH HIGH SPEED CONVEYING ELEMENT

[76] Inventor: Pierre Patin, 15, rue Buffon, 75005 Paris, France

[21] Appl. No.: 866,467

[22] Filed: Apr. 10, 1992

[30] Foreign Application Priority Data

Apr. 12, 1991 [FR] France ................................ 91 04528

[51] Int. Cl.[5] ................................................ B65G 47/66

[52] U.S. Cl. ..................................... 198/324; 198/792

[58] Field of Search ............... 198/324, 325, 334, 784, 198/792

[56] References Cited

U.S. PATENT DOCUMENTS

| | | | |
|---|---|---|---|
| 872,457 | 12/1907 | Russel | 198/324 |
| 3,518,944 | 7/1970 | Patin | 198/792 X |
| 3,565,238 | 2/1971 | Candela | 198/792 |
| 3,583,325 | 6/1971 | Melin | 198/324 |
| 3,592,139 | 7/1971 | Patin | 198/324 X |
| 3,944,044 | 3/1976 | Hamy | 198/334 |
| 5,044,485 | 9/1991 | Loder | 198/334 X |

FOREIGN PATENT DOCUMENTS

| | | | |
|---|---|---|---|
| 0352968 | 1/1990 | European Pat. Off. . | |
| 1323609 | 3/1963 | France | 198/324 |
| 1560309 | 3/1969 | France . | |
| 2274523 | 1/1976 | France . | |
| 2431075 | 2/1980 | France . | |
| 0113174 | 9/1979 | Japan | 198/784 |
| 1383785 | 2/1975 | United Kingdom . | |
| 2025879 | 1/1980 | United Kingdom | 198/334 |
| 2027404 | 2/1980 | United Kingdom | 198/324 |

*Primary Examiner*—Robert P. Olszewski
*Assistant Examiner*—James R. Bidwell
*Attorney, Agent, or Firm*—Sandler Greenblum & Bernstein

[57] ABSTRACT

A conveying device, especially for pedestrians, merchandise or the like includes an area through which an accelerator assembly loads a main conveyor and an area through which a conveyor unloads onto a decelerator assembly. The accelerator assembly is slightly elevated with respect to the loading area of the main conveyor and the decelerator element is slightly lowered with respect to the main conveyor.

14 Claims, 9 Drawing Sheets

Fig - 6a
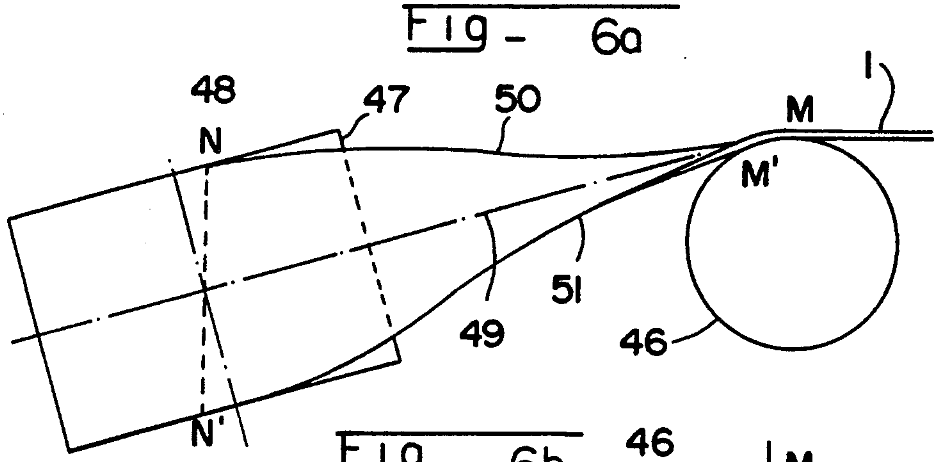
Fig - 6b
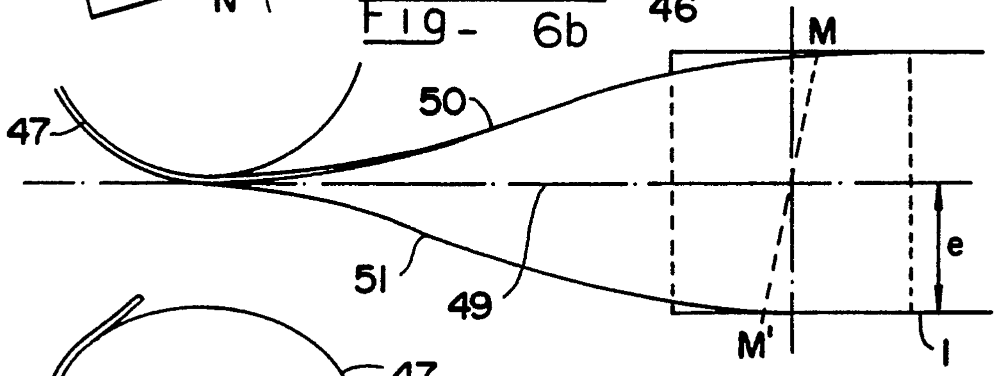
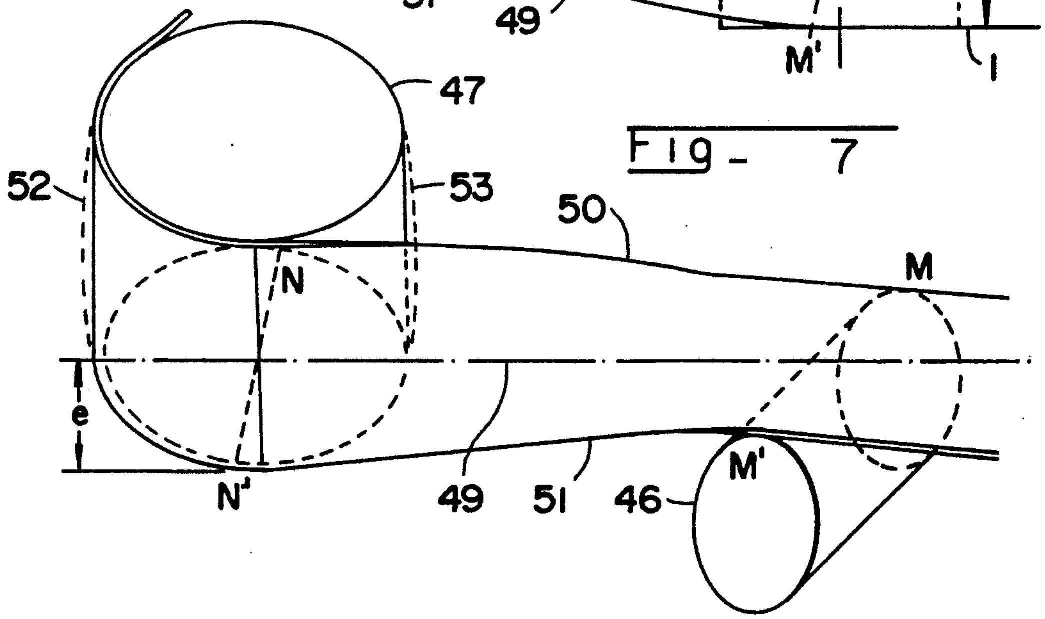
Fig - 7

CONVEYING DEVICE, ESPECIALLY WITH HIGH SPEED CONVEYING ELEMENT

BACKGROUND OF THE INVENTION

1. Field of the Invention

The present invention relates to a conveying device, especially a high-speed conveyor, as well as to improvements in belt conveyors. A high-speed conveyor is understood, here and in the rest of the present text, to be conveyors currently called "accelerated conveyors" which make it possible to carry persons, merchandise or the like along at speeds much higher than the speeds of the conventional conveyors, and especially belt conveyors. These high speeds do not permit the direct loading of the conveyor from a fixed support, since there is a risk of the persons or merchandise being carried along and finding themselves very much out of balance during their transistion from the fixed support to the conveyor. There is a risk of the same problems also occurring at unloading.

2. Description of the Prior Art

To remedy this drawback, it has frequently been proposed to produce conveying systems, for example for pedestrians, constituted by continuous mutually parallel conveyor belts of speeds increasing by degrees when passing laterally from one belt onto the other; the belts are of limited lengths, except for the fastest belt which has the length of the main conveyor, proper. The assembly of lateral belts of limited length constitutes, as the case may be, a lateral loader or unloader (accelerator or decelerator); when, a conveyor for pedestrians is involved, the pedestrians have to take the initiative to pass from one belt to the other, in a time which is necessarily limited since the lateral belts are of much smaller length than the conveyor itself, with all the risks of impact on fixed parts or on other pedestrians. Moreover, this system takes up a great deal of space.

In fact, up to the present day only conveyors with two parallel belts running the whole of the length of the conveyor have been constructed (Chicago Exhibition of 1893 and Paris Exhibition of 1900). Moreover, they involved endless conveyors in a closed loop, thus avoiding the problems of impacts with fixed end elements.

It appears advantageous, to use to the full the possibilities offered by modern conveyor belts of flexible materials, or even by roller conveyors, to produce accelerator loading systems and decelerator unloading systems "end on", that is to say in the alignment of the end parts of the conveyor, thus avoiding the risks due to a lateral loading. Moreover, it will be advantageous, in the case of a pedestrian, for the pedestrian to be able to travel the whole length of the conveyor without letting go of a hand rail element, which is synchronized with the floor which will guide the pedestrian from one end to the other.

It will also be advantageous, in order to use the belt to the full extent while producing very significant savings, to make use of the same belt to produce the output conveyor and the return conveyor, everywhere where such would be useful, and in particular in the case of conveyors for pedestrians called "accelerated rolling pavements".

The first result, namely the end-on loading and unloading, will be obtained by the presently disclosed invention.

The second result, namely the presence of a hand rail synchronous at every point with the opposite element on the floor of the conveyor, will be obtained by the known means, such as disclosed in French Patent Nos. 2,274,523 and 2,431,075 from the same inventor Pierre PATIN.

The third result, namely the use of the same flexible belt in the two directions of travel will also be obtained by particular arrangements and shapes of the drums and end members described herein.

SUMMARY OF THE INVENTION

Thus, an object of the present invention is a conveying device, especially for pedestrians, merchandise or the like, comprising, a main conveyor, mounted on a support, and intended to carry pedestrians, merchandise or the like along at high speed with respect to the support, an accelerator assembly by which the loading of the main conveyor is carried out and a decelerator assembly on which pedestrians, merchandise or the like are unloaded, wherein the area through which the accelerator loads the main conveyor and the area through which the conveyor unloads onto the decelerator element are slightly elevated with respect to, respectively, the loading area of the main conveyor assembly or the area of the decelerator element onto which the main conveyor unloads.

The invention also relates to other characteristics of the conveying device, technically taken advantageously alone or in accordance with all their possible combinations:

The difference in level between the accelerator assembly and the main conveyor and/or the difference in level between the main conveyor and the decelerator assembly is (are) of a height of the order of 2 to 3 centimeters;

The device comprises a transition element arranged between the accelerator assembly and the main conveyor, and one between the main conveyor and the decelerator assembly. The transition elements offer said pedestrains, merchandise or the like an inclined support surface linking, in a substantially non-discontinuous way, the main conveyor with respectively, the accelerator assembly and/or the decelerator assembly. This support surface is passed over without contact by the object moved in normal operation;

The main conveyor is a belt conveyor carried by at least two drums rotating around axes which are fixed with respect to the support. A transition element at least partly bears on the belt, the contact between the belt and the transition element being produced tangentially in the area of bearings and/or rollers rotating around axes, which are fixed with respect to the transition element, the bearings or rollers rolling on the belt when the belt is moving;

The belt of the main conveyor is a belt with longitudinal ribs, a transition element being equipped with teeth forming a comb and arranged between the ribs in order to position the transition element with respect to the belt and ensure safety of transfer;

A transition element comprises partitions prolonging the teeth of the comb, or interposed between them and connected together by at least two transverse elements. The partitions carry the axes of the abovementioned bearings for contact with the belt of the main conveyor;

An accelerator assembly or a decelerator assembly is (are) of the roller type, the rollers being driven in rotation by drive belts which act either directly on these rollers or on pulleys which drive these rollers. The diameters of the rollers or of the pulleys are variable in such a way as to respectively produce a progressive acceleration or deceleration of the pedestrians, merchandise or the like; such an assembly can comprise several hundreds of rollers in order to provide continuity of the speed variation; they are grouped by acceleration elements, each comprising of an order approximately ten rollers;

The assembly of the rollers of the accelerator assembly or of the decelerator assembly is extended beyond the drive belts and in the area of the main conveyor by transition rollers which are themselves driven in rotational movement by friction with the contact bearings of the transition element with which they are associated;

A transition roller, extending an accelerator or decelerator assembly in the region of a transition area with the main conveyor assembly, is mounted rotatably on an axle of the corresponding transition element;

A transition element is mounted roll on a drive belt drive drum of the accelerator or decelerator element with which it is associated;

The return or drive drums, on the one hand, of the bearings or the drive belts of the accelerator assembly and/or of the decelerator assembly, and, on the other hand, of the belt of the main conveyor are substantially juxtaposed, the drive belts and the belt being locally at least partially tangent;

A roller of an accelerator element or of a decelerator element comprises a shaft forming an axle, which carries, distributed alternately along its length, disks intended to carry pedestrians, merchandise or the like, and disks or pulleys intended to drive, by contact and friction with the drive belts, the roller assembly. The disks of two successive rollers interleaving into one another like a comb. The diameter of the drive disks or pulleys of several successive rollers vary, for a same drive belt, in a progressive way, so that the rotational speeds of several successive rollers and the tangential speeds of their carrying disks vary progressively in order to produce the acceleration or deceleration desired;

The carrying disks of several successive rollers of an acceleration element or of a deceleration element are all of the same diameter;

In another arrangement, all the rollers of an acceleration element have the same speed of rotation, but the carrying disks have different diameters;

The conveyor belt is also associated with half-turn drums with a respective axis substantially perpendicular to the drums which carry it on its part intended to carry pedestrians, merchandise or the like along. The half-turn drums permit the lateral return of the conveyor belt with respect to its driving part;

The belt is also used in its return as a conveyor belt;

In this case, a half-turn drum or a return drum on a half-turn drum bulges at its central part;

If a tensioning counter-drum exists, it is grooved in order to maintain the conveyor belt in correct longitudinal position and avoid any lateral displacement.

It will be noted that one of the important advantages of the accelerator and decelerator elements of the device proposed by the present invention lies in that they permit transition with the main conveyor at constant speed. The tangential speed of the end carrying rollers is equal to the speed of the belt of the conveyor.

The description and the figures which will follow will make the characteristics of the invention well understood.

FIG. *3a* represents the mounting of the drive rollers between a lower carrying grid and an upper safety grid.

FIG. *3b* represents the drive principle for the rollers by drive belts and pulleys on the end of the roller.

Figure 4:
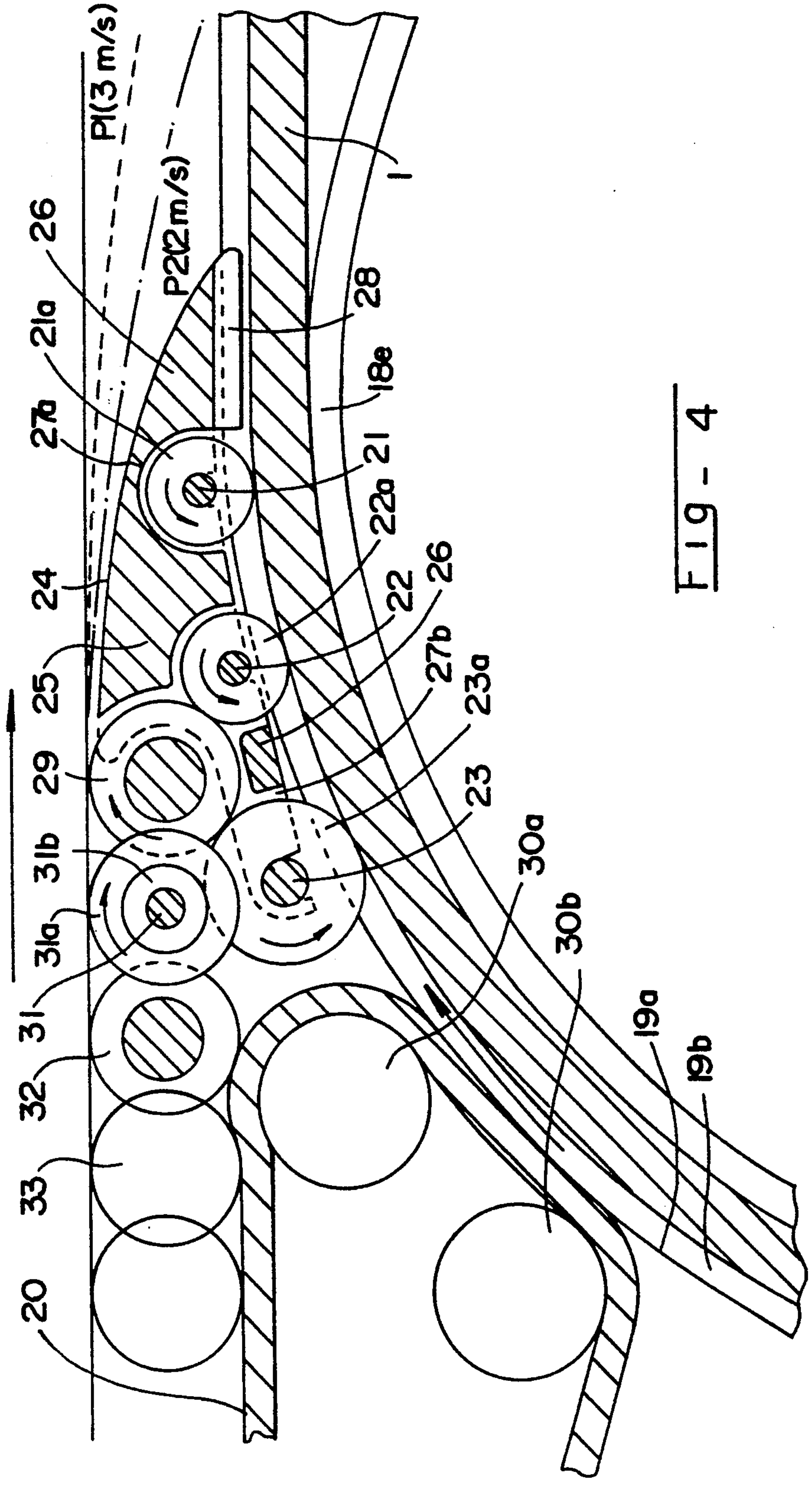

FIG. 4 represents, in cross-section, the area of connection between the loader and a continuous conveyor belt in reinforced elastomer, for example.

Figure 5:
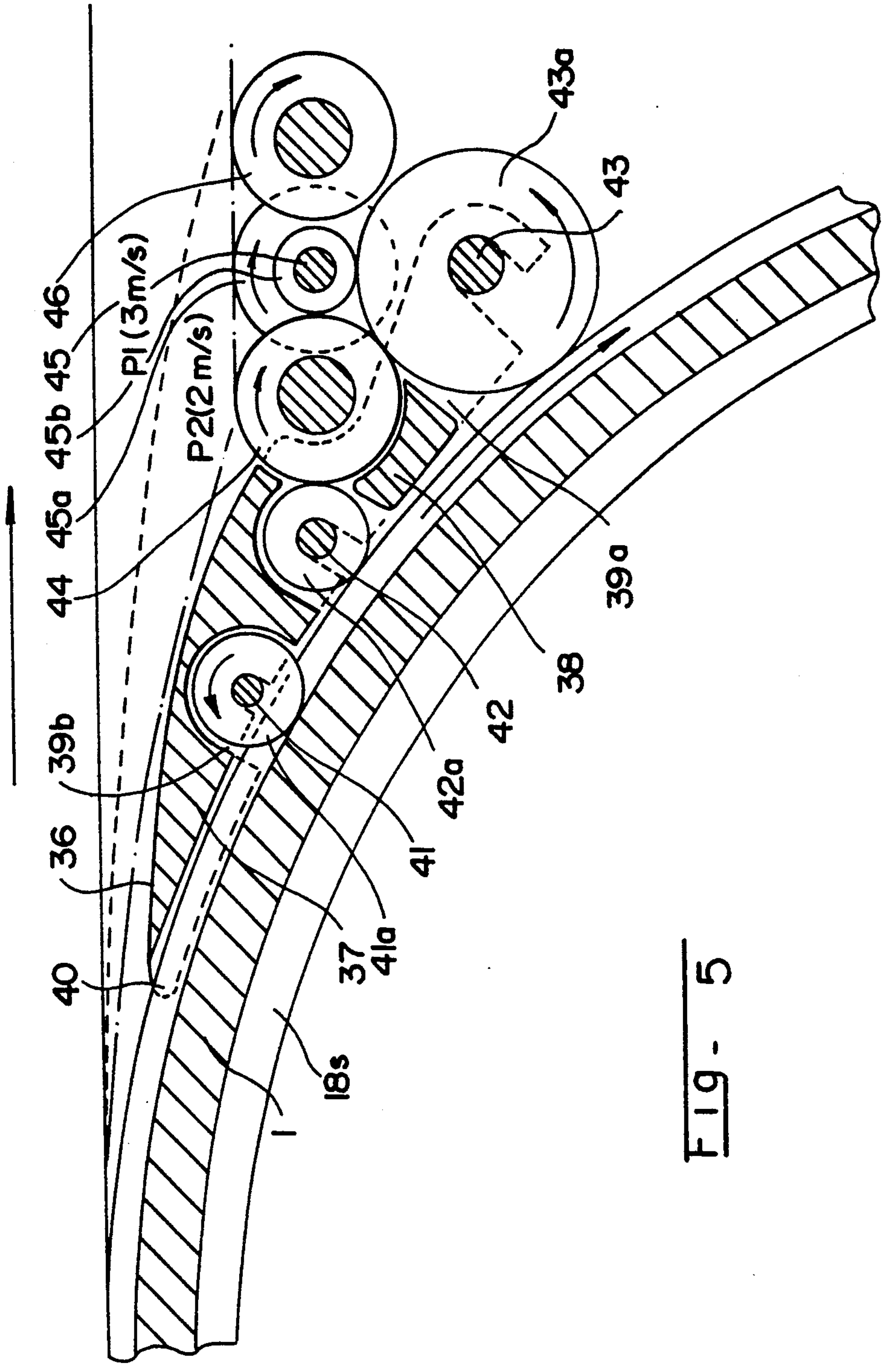
Figure 8A:
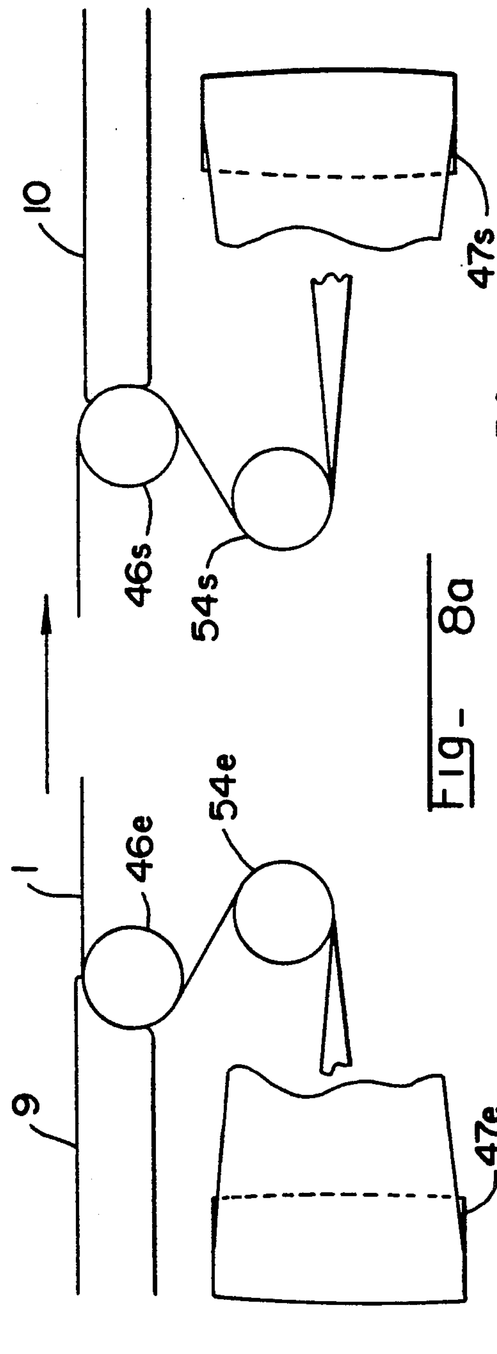
Figure 8B:
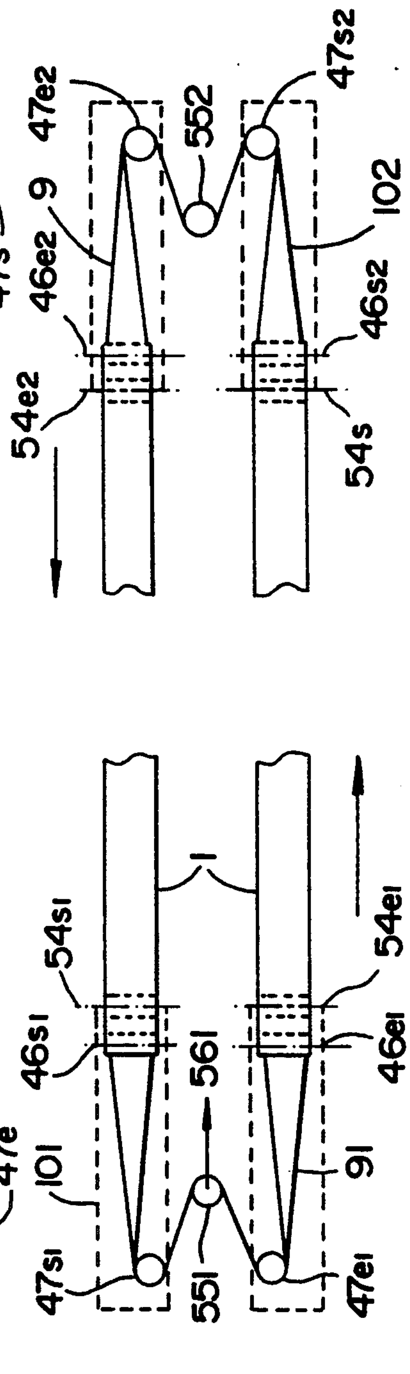

FIG. 5 represents, in cross-section, the area of connection between the continuous belt and the unloader.

FIGS. *6a* and *6b* represent, respectively, in elevation and in plan view, one element of the device for return of the conveyor belt making it possible to cause the latter to undergo longitudinal pivoting by 11/2. Two such elements, which are symmetric, with respect to a vertical plane, make it possible to cause the belt to make a half-turn in plan view, while either keeping the same surface of the belt turned upwards, or turning the surface over.

FIG. 7 represents the device of FIGS. *6a* and *6b* in perspective.

FIGS. *8a* and *8b* represent, respectively, in elevation and in plan view, the devices able to constitute an accelerated rolling pavement having two directions.

DESCRIPTION OF THE PREFERRED EMBODIMENT

In order for a high-speed conveyor to be of interest, its length needs to exceed about one hundred meters. Thus, this type of conveyor has been given the name of hectometric conveyor, and which in particular comprises pedestrian conveyors called "accelerated rolling pavements". It is also necessary for the speed to achieve a value which is clearly greater than walking speed. Double this speed is generally aimed at, i.e. about 3 m/s, although admittedly the entry or exit speed on a conventional rolling pavement must not exceed 0.75 to 0.90 m/s for reasons of safety.

Figure 1:
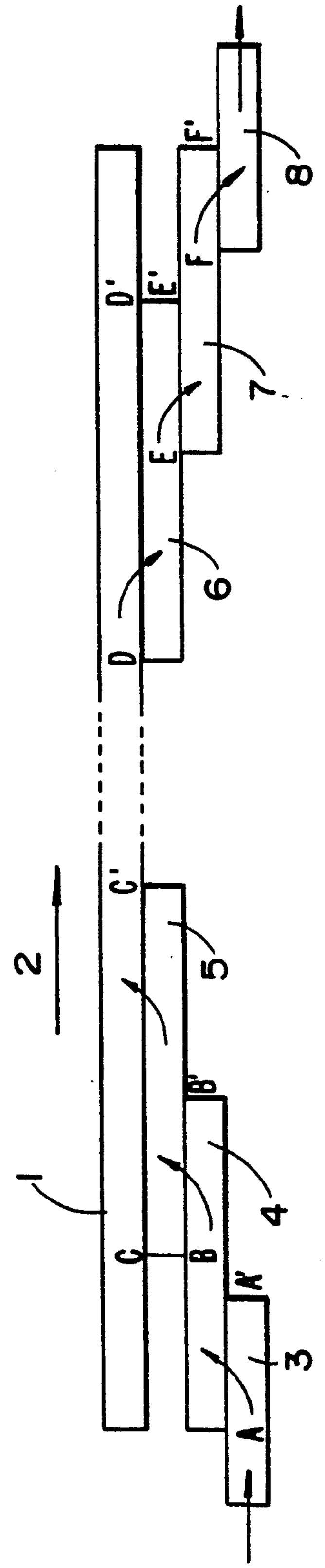
Fig - 1 PRIOR ART
FIG. 1 represents the principle of a conveyor with lateral loading and unloading.

In FIG. 1, which corresponds to previously suggested devices, the main conveyor belt 1 moves, for example, at a speed of 3 m/s in the direction of the arrow 2. The loader system is constituted by belts 3, 4, 5 which move at increasing speeds of respectively 0.75 m/s, 1.50 m/s, 2.25 m/s. The unloader system is constituted by the belts 6, 7, 8 which move at decreasing speeds 2.25 m/s, 1.50 m/s, 0.75 m/s.

In the loading system, there exist overlap areas AA', BB', CC' between the successive belts which permit passage from one belt to the other and which, if it is assumed that the time of passage is the same in the various cases, must be of increasing lengths, having regard to the speeds. Moreover, safety devices, providing for the stopping of the whole conveyor, have to be provided for the case where the user comes too close to the end of any of the belts to have the time to change belt, which would lead the user either to collide with a fixed part, or to be ejected at high speed. Devices, obviously symmetric, constitute the unloader, with overlap areas DD', EE', FF' of decreasing lengths.

The size, the complexity and the risks which such a system must exhibit can be imagined, the more so since the speed steps of 0.75 m/s can only be used if the pedestrians have a hand-hold available on each belt, a hand-hold which creates other constraints. Experiments carried out in France, in Great Britain and in the United States have shown that in order to carry out lateral loading in complete safety without a hand-hold, the speed difference between the two adjacent moving parts must not substantially exceed 0.3 m/s (which would lead to a minimum of 7 loading and unloading belts).

It can thus be imagined that, in fact, this type of conveyor has never been used.

Figure 2:
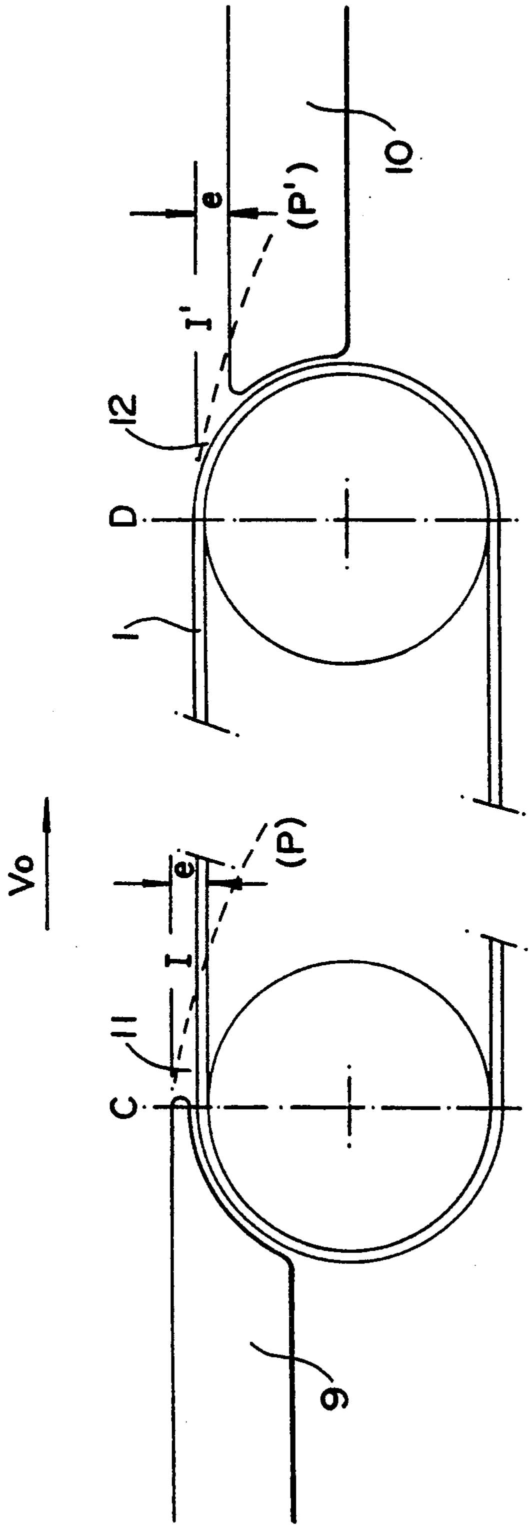
FIG. 2 represents the principle on which the design of a conveyor with end-on loading/unloading is based.

FIG. 2 represents the principle of a conveyor constituted by:

An end-on loader, making it possible to accelerate an object or a pedestrian from a safe speed (of the order of 0.75 m/s) to a usable speed (equal to or greater than 3 m/s).

A continuous conveyor belt of any length moving at a constant speed (equal to the speed of exit from the loader).

An end-on unloader, making it possible to decelerate an object or a pedestrian from the speed of the belt to the exit safety speed, equal in principle to the entry speed.

The entire system is based on the fact that, the transition speed between two elements, loader and belt, or belt and unloader, having a significant value, it is possible, by ensuring a slight difference in the level between two of these elements in the direction of movement, to make the object or the pedestrian cross these transitions by permitting a slight and extremely short loss of support, thus avoiding any contact with a fixed element.

In fact, in FIG. 2, a system includes three elements, loader 9, belt 1, unloader 10, such that between the end of the loader 9 and of the belt 1, there exists a difference in level e of 20 to 30 mm, and similarly between the end of the belt 1 and the unloader 10, and suppose that the speed of the belt, which is also that of the loader 9 and of the unloader 10 at the transition points C and D, is 3 m/s.

A point object, crossing the transition C with a speed $V_0=3$ m/s, describes a parabola defined by $x=v_0 t$ and $Z=-\frac{1}{2}g.t^2$, where g is the acceleration due to gravity. This parabola cuts the level of the belt 1, lower by a value e at the end C of the loader, at a point I defined by the value of t given by $e=\frac{1}{2}g.t^2$, $CI=v_0.t_0$. If e=20 mm, it is found that t=0.064 s and CI=191.7 mm. For e=25 mm, t=0.071 s and CI=214 mm. It is the same for D at the exit from the belt.

It is seen that this arrangement makes it possible to cross the transition areas 11 and 12 without contact. In the case of a pedestrian, it all happens as if he were to fall or jump from a height of 2 cm or 2.5 cm, which gives rise to a completely negligible sensation, which can moreover be anticipated by virtue of adequate advance notice.

This difference in level is, in any case, substantially that which exists in mechanical stairs and conventional rolling pavements between landing plates and moving elements (steps, pallets or belts).

It goes without saying, however, that the transition areas 11 and 12 cannot be left empty. In fact, in the case of unexpected stopping, for example, in an emergency, the parabolae P and P' will approach the vertical, and the distances CI and DI' will be reduced.

It is also necessary to take account of the possibility that a stick, or a crutch, will become jammed into one of these areas, if they are not equipped, especially at the exit 12 from the belt. In order to avoid such risks, the transition areas are equipped with comb devices which will be described later, while taking account of the composition of the loading and unloading devices which will be restated first of all.

This arrangement, which forms the subject of French Patent No. 1,560,309 from the same inventor, gives rise, through the present invention, to various improvements and simplifications.

Thus, in a first embodiment of a pedestrian accelerator, an accelerator element is constituted by a certain number of rollers such as 13, 14 resting on drive belts such as 15 driven in the inverse direction to the movement of the conveyor by pulleys 16 and carried by return pulleys 17.

The pulleys 16 are integral with the shaft **16*a* which is itself driven by a motor, in relation to the speed of the belt such that the various accelerator elements have regularly increasing speeds. The pulleys 17 are idle on the shaft 17*a*, onto which are fastened other pulleys (not represented) which have, for the following element, the same role as the pulleys 16** for the element in question.

Each roller 13 or 14 comprises a stack of disks which, between contiguous rollers, interleave into one another with a certain clearance, in such a way as to produce a reciprocal comb in order to avoid introduction of any object whatever between the roller. These disks are integral with roller 13 or 14 and form an axle which carries them. These disks have, generally, the same diameter so as to constitute, through the upper tangent plane common to all these disks, a bearing surface for the objects or the feet of the pedestrians, their diameter being sufficiently small (of the order of 30 mm) that the assembly is sensed as a grid of small mesh. Thus, the disks **13*b*, 14*a*, 14*c*** have the same diameter.

In contrast, the disks **13*a*, 14*b* by which the rollers rest on the drive belts 15 have diameters which change with their position with respect to the shaft 16*a*. Thus, the carrying disk straight above this shaft will have the same diameter as 13*b*, 14*a* or 14*c*, then the diameters are reduced slightly; thus, disk 13*a* will be a little smaller than 13*b* or 14*a* and 14*b* a little smaller than 13*a*. These two disks 13*a* and 14*b* being driven by the same drive belt 15, the speed of rotation of the roller 14 will be a little higher than that of the roller 13**. Thus, by slightly varying the diameter of the rollers, for example by 10% between the entry and the exit of an accelerator element, a variation in speed of 10% is produced. If a variation in speed of 1 to 4 is sought, 15 acceleration elements are sufficient in principle (log 4/log 1.1=14.54). In fact, for practical reasons of production, all the acceleration or deceleration elements will have the same length and the same number of rollers, of the order of about 10 each. Deceleration is obtained by similar, but symmetric means.

Needless to say, the drive belts 15 can be supported between the axles **16*a* and 17*a*** by large-diameter rollers, in order to avoid awkward flexing of the drive belts. At their ends, the rollers are simply positioned by ball or needle bearings which are not carriers, the rollers being carried solely by the drive belts. The play between rollers is such that horizontal deflections due to the inertial forces (acceleration and deceleration determined equally with this aim) do not give rise to friction between rollers.

It will be noted that, in French Patent No. 1,560,309, the floor is constituted by two layers of superimposed rollers; it is the rollers of the lower layer which produce the variation in speed and rest on these drive belts which have the same direction of movement as the main belt. The rollers of the upper layer are then all identical but the interleaved comb structure advocated above was not provided in the French Patent. This arrangement with two layers of rollers could be adopted if fatigue in the upper rollers appeared too high. It could also be adopted by constituting each acceleration element by rollers all rotating at the same speed, but of slightly increasing diameter from the entry to the exit of the accelerator element (and conversely in the decelerator). These rollers could also be replaced by a certain number of bearings or wheels carried by the structure.

In the embodiments described by French Patent No. 1,560,309, the rollers are sunk into a safety grid which opposes the introduction of any object whatever between the rollers.

In an embodiment combining the advantages of this arrangement with those of the embodiment which has just been described, the rollers, all of the same diameter, are placed between an upper safety grid and a lower carrier grid, and are driven by pulleys, mounted free wheeling, on the end of the roller, these pulleys having, in the same accelerator or decelerator element, slightly variable diameters, and being driven by one or preferably two drive belts.

Figure 3:
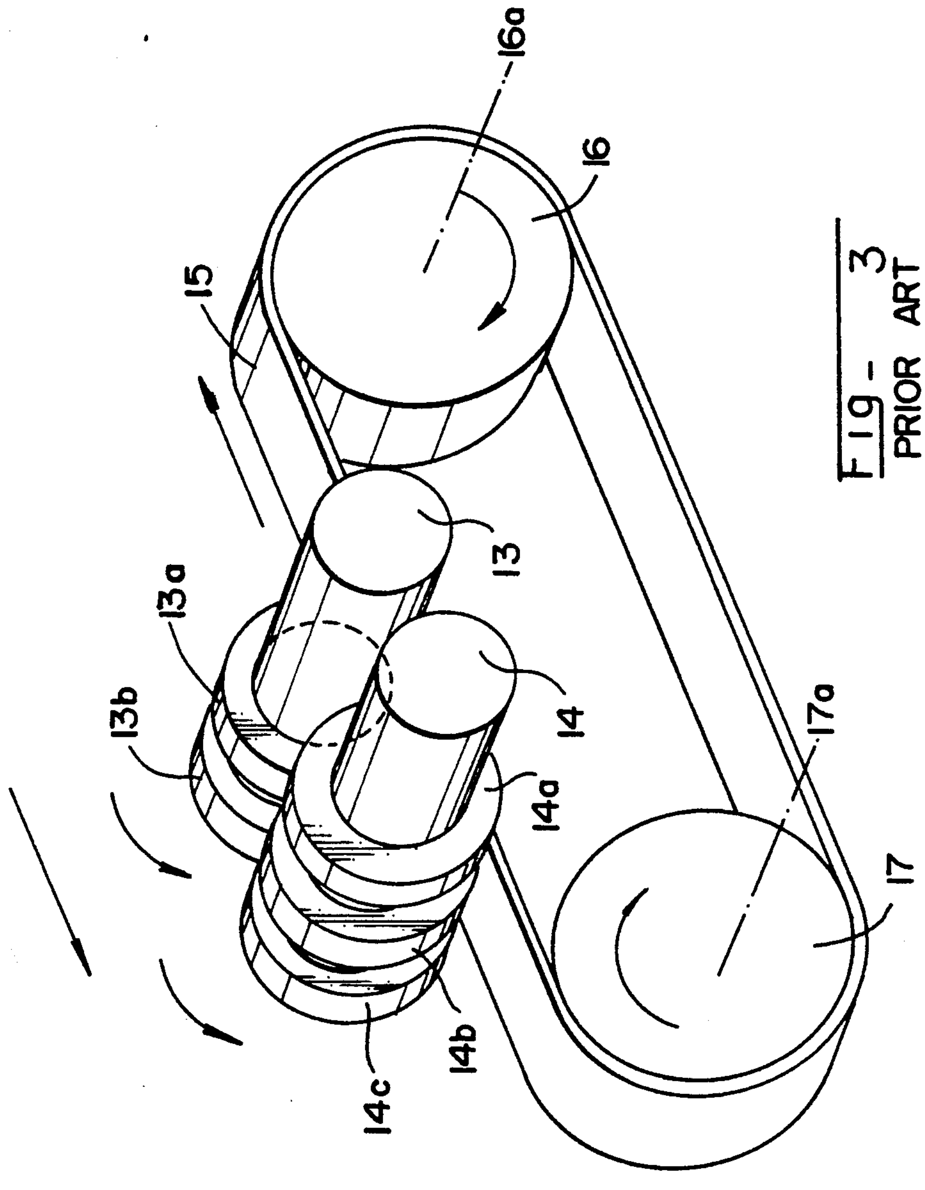
Fig-3 PRIOR ART
FIG. 3 represents the principle of variation in speed in a loader with rollers, a principle disclosed in French Patent 1,560,309.
Figure 3A:
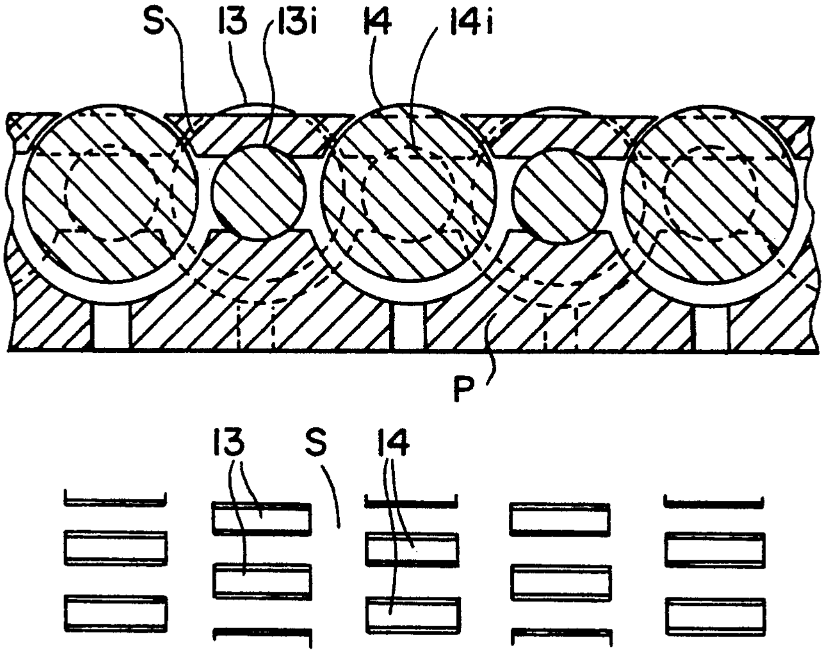

FIG. 3*a* represents a longitudinal cross section of an accelerator element; the rollers rest, with the bottom of their grooves or intervals between ribs 13*i*, 14*i*, on the lower carrying grid P, and are covered by a safety grid S such that the ribs of the rollers project from its surface only by a height of the order of 2 mm. This arrangement also has the role of preventing the phenomena of instability of rotation of the rollers.

Figure 3B:
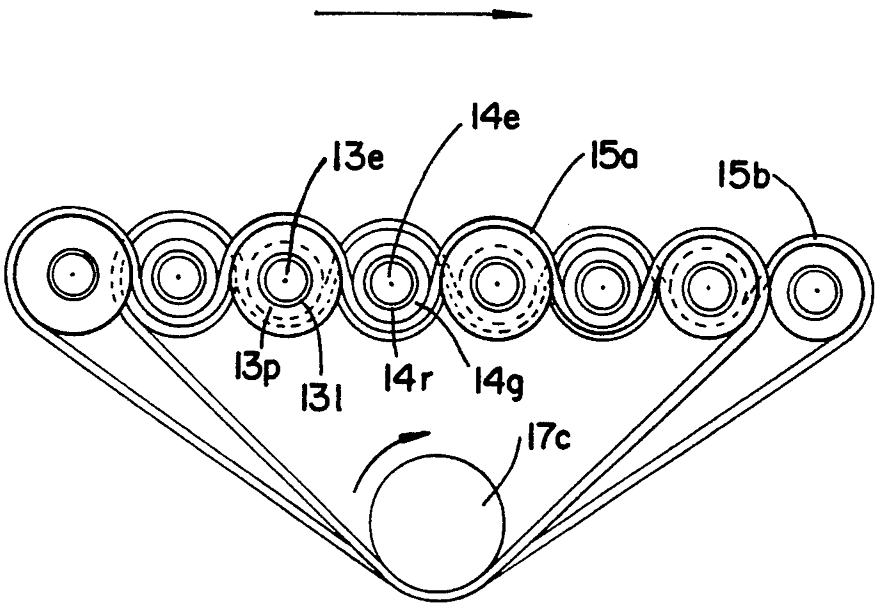

FIG. 3*b* represents the mode of driving of an accelerator element comprising 8 driven rollers, alternate rollers being driven by the drive belt 15*a*, and the remaining rollers by the drive belt 15*b*, the two drive belts being themselves driven by the motor pulley 17*c*, the mid plane of the drive belt 15*b* and of the pulleys which it drives being offset rearwards with respect to that of the drive belt 15*a*.

In this mid plane, the end piece 13*e* of a roller 13 carries a pulley 13*p* which drives the roller by virtue of the needle bearing free wheel 13*l*, this free wheel having the role of avoiding transmission of forces between rollers by the agency of the persons or objects conveyed.

So as to produce a sufficiently large arc of contact, the drive belt 15*a* is turned around on the wheel 14*g* carried by the end part 14*e* of the roller 14 by the needle bearing 14*r*, which rotates in the reverse direction to the roller which carries it.

The drive belt 15*a* thus drives four rollers by the pulleys such as 13*p*, whose diameters vary from one end to the other of the acceleration element. It is the same for the drive belt 15*b*.

It will be noted that for an acceleration element comprising a specified number of rollers, the variation in speed is not constant, either in absolute value or in percentage.

In fact, the distance between two rollers being x and the speed variation v, then $x = v \cdot t$ and $v = J \cdot t$, wherein $$\frac{dv}{dx} = \frac{J}{v}$$

where J represents the acceleration, generally fixed (except at the entry and at the exit where there is generally defined a constant jerk dJ/dt) and where v is increasing, thus v/x is decreasing.

FIG. 4 represents in cross-section the end 11 of the loader. The conveyor belt 1 is carried by a drum 18*e* which can be driving. This belt comprises ribs 19*a* on which auxiliary belts 20 can come to bear, driven by contact with the belt 1, and between these ribs, grooves 19*b* which permit combing and in which roll bearings 21*a* and 22*a* and 23*a* carried respectively by the transverse shafts 21, 22 and 23.

The comb 24 is constituted by two transverse elements 25 and 26 carrying partitions 27*a*, 27*b*, which are interposed with respect to the teeth 28 of the comb. These partitions maintain a constant and precise spacing between the axles 21, 22 and 23 which carry the comb and are fitted with bearings, respectively 21*a*, 22*a*, 23*a* rolling in the grooves 19*b* of the belt 1. The bearings 22*a* and 23*a* carry, in "centerless" position, the roller 29 whose peripheral speed is thus equal to the speed of the belt.

An axle 31 carries bearings 31*a* separated by spacers 31*b* which bear on the bearings 23*a*. As a result the axle 31 rotates faster than the roller and tends, by friction, to drive the bearings 31*a* which, being idle, do not intervene in the movement of the object carried which is driven by the neighboring rollers 29 and 32.

Similarly, the rollers 32, 33 carried by the auxiliary belt 20 have an identical direction of rotation and tangential speed. In the figure, the points of contact between rotating elements are strengthened and the directions of rotation illustrated by arrows. The hatched elements are fixed. The double-hatched shafts are rotatable.

As the parabolae $P_1$, $P_2$ represent the trajectories of an object passing over the bearings 29*a* at speeds respectively of 3 m/s, 2 m/s, it is seen that in normal service, only an object held firmly against the surface risks coming into contact with the upper, very sloped, surface of the comb 24, a surface which the object will, moreover, reach with an initial speed equal to that of the belt. There is thus no risk of blockage.

FIG. 5 represents, in cross-section, the end 12 of the unloader. The conveyor belt 1 is driven by a drive drum 18*s*.

The comb 36 comprises two transverse elements 37 and 38 linked by partitions 39*a* which extend the combing teeth 40 and 39*b* which are interposed between the teeth. These partitions provide relative positioning of the axle 41, carrying the bearings 41*a*, of the axle 42, carrying the bearings 42*a* and of the axle 43, carrying the bearings 43*a*.

The rollers 44 and 46 are driven by the bearings 43*a*. The assembly 45, 45*a*, 45*b* has a role similar to the assembly 31, 31*a*, 31*b* of the loader.

As in the case of the loader, the position of the parabolae $P_1$ (3 m/s) and $P_2$ (2 m/s) shows that in normal service, there is no contact in this area. It is only during slowing down to stop that such contact can take place, but the speeds then being low and the conveyor being empty in the majority of cases, the risks of incidents are then negligible.

In a simplified embodiment, for example for the transport of merchandise, the combs could be constituted simply by an extension of the carrying grid P and safety grids S (FIG. *3a*).

It will be noted that it is obviously possible, by using elements of the accelerator and decelerator systems described above, to create connecting elements, with constant or variable speed, between two different belts. In particular, by using rollers which are cylindrical or slightly conical forming between themselves a small angle, it is possible to obtain curved areas, with constant or variable speed, making it possible to connect together areas in alignment. Such areas can give rise to skewing in order to compensate for the centrifugal force.

In FIG. *6a*, the belt 1 bearing on a drum with a horizontal axis 46 is about to start its half-turn around another drum 47 whose axis 48 is perpendicular to a plane tangent to the drum 46. Similarly, the vertical plane of symmetry of the belt 1, whose track on FIG. *6b* is the straight line 49, is tangent to the drum 47. The band bearing on these two drums, whose axes are orthogonal in space takes a twisted, so-called windmill blade shape, well known in the use of drive belts. The only non-deformed longitudinal fiber of the belt is precisely that which projects, in plan as in elevation on the line 49, which is the intersection of the respective planes of symmetry of the two drums perpendicular to their respective axes of rotation. All the other longitudinal fibers of the belt are deformed and elongated as a function of their distance to the fiber 49, the most deformed being the fibers 50 and 51 of the edges of the belt; experiment proves that the deformation is projected, in elevation as in plan, in the form of a curve of sinusoidal path.

In FIGS. *6a*, *6b* and 7 the lines of contact of the belt on the drums are represented as MM' and MN'.

If the width of the belt is called 2e, which is also the length of the drums 46 and 47, it can be seen that the length after deformation of the outer fibers 50 and 51 is a little greater than $L^2+2e^2$, i.e. $L' = (1+k)\ L^2+2e^2$. Moreover, these two fibers are only deformed strictly equally if the drums 46 and 47 have the same diameter.

If cylindrical drums are used, as represented in FIGS. *6a* and *6b*, the outer fibers 50 and 51 will be more stretched than the fiber 49; such conveyor belts being only slightly elastic, such a device risks leading to differences in tension and to malfunctions or instabilities. They will be remedied:

1) by significantly privileging the longitudinal fibers of the belt;

2) by giving the drum 47 (and as the case may be the other drums constituting the half-turn device) a bulge such that the lengths developed by all the longitudinal fibers of the belt should be the same between the two drums 46 at the end of the horizontal belts. Such a bulge is indicated in dots and dashes at 52 and 53 on the drum 47 of the figure.

In these conditions, a double-direction accelerated conveyor can be represented in a non-limiting way by the FIGS. *8a* (in elevation) and *8b* (in plan view).

At the end 1, the belt arrives on a cylindrical horizontal drum 46 $s_1$ and begins its half-turn on the bulged drum 47 $s_1$ with a vertical axis. The tension of the belt being supplied by a vertical return drum 551, which is cylindrical or bulged, pushed in the direction of the arrow 561 by a spring or a jack, the belt next rolls on a bulged drum 47*e*, and becomes the outgoing belt after passing over the counter-drum 54*e*, and the drum 46*e*.

In order to ensure that the resultant of the longitudinal tensions applied to the band is correctly in its axis, the vertical axes of the bulged drums 47 are slightly offset by ¾ of the bulge with respect to the axis of the belt.

The end 2 is constituted in the same way. At each end are arranged, above the half-turn device of the belt, the accelerators 91 and 92 and the decelerators 101 and 102. However, it goes without saying that the return device described can be used in conventional, non-accelerated conveyors. In such a case, this device could obviously take simpler forms (without a counter-drum) which is not necessary to describe in more detail.

However, the presence of a counter-drum can be imposed for technical reasons. In fact, on high-speed belts, differences of any nature in the belt or its loading can give rise to lateral displacements of the band on its drum. These displacements are avoided by grooving the counter-drum in the opposite direction to the ribs of the belt in such a way as to perfectly position the latter.

The positions of the bearings and the rollers in the transition elements, or of the drive belts in the acceleration elements, could be different to those adopted in the description without departing from the scope of the invention.

What is claimed is:

1. A device for conveying objects comprising:

a support, a main conveyor mounted on said support to carry the objects and having a high speed, an accelerator assembly for end on loading of the main conveyor, a decelerator assembly for end on unloading of the main conveyor, a first fixed transition element placed between and forming a surface linking the accelerator assembly and the main conveyor, a second fixed transition element placed between and forming a surface linking the main conveyor and the decelerator assembly, wherein the accelerator assembly is at a first predetermined height above the main conveyor, and the decelerator assembly is at a second predetermined height under the main conveyor, the first predetermined height and the second predetermined height being so related to the speed of the main conveyor that the objects cross over the first and the second transition elements avoiding any contact with the first and second transition elements.

2. The conveying device as claimed in claim 1, wherein at least one of the first and second predetermined heights is of the order of 2 to 3 centimeters.

3. The conveying device as claimed in claim 1, wherein said main conveyor is a belt conveyor having a belt carried by at least two drums rotating around axles which are fixed with respect to the support, said transition element at least partly bearing on said belt, the contact between said belt and said transition element being produced tangentially in the area of bearings rotating around axles which are fixed with respect to the transition element, said bearings rolling on said belt when the belt is moving.

4. The conveying device as claimed in claim 3, wherein the belt of the main conveyor is a belt with longitudinal ribs, said transition element being equipped with teeth forming a comb and arranged between said ribs in order to position said transition element with respect to said belt and ensure safety of transfer.

5. The device as claimed in claim 4, wherein said transition element comprises partitions extending the teeth of the comb, said partitions carrying the axles of said bearings for contact with the belt of the main conveyor.

6. The conveying device as claimed in claim 1, wherein at least one of said accelerator assembly and said decelerator assembly includes rollers, said rollers being driven in rotation by drive belts, the diameters of said rollers being variable from one roller to the other, in such a way as to produce respectively a progressive acceleration or deceleration of the objects.

7. The conveying device as claimed in claim 6, wherein the rollers of at least one of said accelerator assembly and said decelerator assembly are extended beyond said drive belts and in the area of the main conveyor by transition rollers which are themselves driven in rotational movement by friction with contact bearings with which they are associated.

8. The conveying device as claimed in claim 7, wherein said transition roller extending, at least one of said accelerator and decelerator assembly in the region of a transition area with the main conveyor is formed by bearings mounted rotatably on an axle of the corresponding transition element.

9. The conveying device as claimed in claim 1, wherein said transition element is mounted on a drive drum of at least one of said accelerator and decelerator element with which it is associated.

10. The conveying device as claimed in claim 6, wherein the drive drum of the drive belts of at least one of the accelerator assembly and the bearings of the decelerator assembly and of the main conveyor are substantially juxtaposed, said drive belts and said belt being at least partially tangent.

11. The conveying device as claimed in claim 6, wherein a roller of at least one of said accelerator element and of said decelerator element comprises a shaft forming an axle, which carries, distributed alternately along its length, disks intended to carry objects and disks intended to drive, by contact and friction with said drive belts, the disks of two successive rollers interleaving with one another, the diameter of drive disks of several successive rollers varying, for the same drive belt, in a progressive manner, so that the rotational speeds of several successive rollers and the tangential speeds of their carrying disks vary progressively in order to produce the acceleration or deceleration desired, the carrying disks of several successive rollers of at least one of said acceleration assembly and or said deceleration assembly being all of the same diameter.

12. The conveying device as claimed in claim 1, wherein the main conveyor is also associated with half-turn drums with their respective axes substantially perpendicular to the drums which carry a belt of said main conveyor, said half-turn drums permitting the return of the belt laterally with respect to a driving part, the belt being also used in its return as a conveyor belt to support objects, said device being driven in two directions.

13. The device as claimed in claim 12, wherein at least one of a half-turn drum and a return drum on a half-turn drum is bulged at its central part.

14. The device as claimed in claim 12, wherein a counter-drum for tensioning is grooved opposite to the belt in order to prevent any lateral displacement of said belt.

* * * * *